US011962579B2

(12) United States Patent
Allamsetty et al.

(10) Patent No.: US 11,962,579 B2
(45) Date of Patent: Apr. 16, 2024

(54) VEHICLE CHARGING SYSTEM

(71) Applicant: Rivian IP Holdings, LLC, Plymouth, MI (US)

(72) Inventors: Chakravarthy K. Allamsetty, San Jose, CA (US); Connie Wong Yang, Saratoga, CA (US); Nilesh Darade, Milpitas, CA (US); Dmitriy Ansolis, Seattle, WA (US); Liang Kong, Santa Clara, CA (US); Roni Michaels, Moss Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/931,654

(22) Filed: Sep. 13, 2022

(65) Prior Publication Data
US 2024/0089245 A1 Mar. 14, 2024

(51) Int. Cl.
*B60L 53/66* (2019.01)
*B60L 53/30* (2019.01)
(Continued)

(52) U.S. Cl.
CPC ........ *H04L 63/0823* (2013.01); *B60L 53/305* (2019.02); *B60L 53/66* (2019.02);
(Continued)

(58) Field of Classification Search
CPC ..... H04L 63/0823; H04L 9/32; H04L 9/3263; H04L 9/3268; B60L 53/305; B60L 53/32; B60L 53/34; B60L 53/66
See application file for complete search history.

(56) References Cited

U.S. PATENT DOCUMENTS

| 9,623,761 B2 * | 4/2017 | Gale | B60L 53/60 |
| 2011/0099144 A1 * | 4/2011 | Levy | B60L 53/30 |
| | | | 709/227 |
| 2020/0238847 A1 * | 7/2020 | Wiseman | B60L 53/67 |

FOREIGN PATENT DOCUMENTS

| CN | 103650292 B | * 10/2016 | B60L 1/003 |
| DE | 102017004882 A1 | * 12/2017 | |

(Continued)

OTHER PUBLICATIONS

"Certificate-based Authentication of Charging Stations"—Roland Angerer, Has-To-Be, Dec. 2, 2019 https://has-to-be.com/wp-content/uploads/2020/04/Whitepaper_Certificate_Authentication-1.pdf (Year: 2019).*

(Continued)

*Primary Examiner* — Randy A Scott
(74) *Attorney, Agent, or Firm* — Foley & Lardner LLP

(57) ABSTRACT

Disclosed are systems and methods for vehicle charging. A charging system can include a component to convey power to a vehicle to charge the vehicle. The charging system can include a module to store a certificate via a cryptographic technique. The charging system can include a data processing system coupled to the module, the data processing system including one or more processors, coupled with memory, to retrieve the certificate from the module, transmit, to a second data processing system, a request to establish a communication connection, the request including the certificate, and establish the communication connection with the second data processing system responsive to a verification of the certificate by the second data processing system. The data processing system can transmit, to the second data processing system, data corresponding to power conveyed by the component to the vehicle subsequent to verification of the certificate.

20 Claims, 6 Drawing Sheets

(51) Int. Cl.
  *H04L 9/40* (2022.01)
  *B60L 53/126* (2019.01)
  *B60L 53/16* (2019.01)
  *B60L 53/34* (2019.01)
  *H04L 9/32* (2006.01)

(52) U.S. Cl.
  CPC .............. *B60L 53/32* (2019.02); *B60L 53/34* (2019.02); *H04L 9/32* (2013.01); *H04L 9/3263* (2013.01); *H04L 9/3268* (2013.01)

(56) References Cited

FOREIGN PATENT DOCUMENTS

WO WO-2022065989 A1 * 3/2022 .............. B60L 53/66
WO WO-2022232740 A1 * 11/2022 .......... H04W 12/062

OTHER PUBLICATIONS

"Using PKI to Secure Plug and Charge"—Prateek Panda, Intertrust, May 21, 2021 https://www.intertrust.com/blog/using-pki-to-secure-plug-and-charge/ (Year: 2021).*

* cited by examiner

VEHICLE CHARGING SYSTEM

INTRODUCTION

A vehicle, such as an electric vehicle, can be powered by batteries. The vehicle can include components that operate the vehicle based on power provided by the batteries.

SUMMARY

An aspect of this disclosure can be generally directed to providing a secure way to identify and verify a connection request that originates from a charging system (or charging station) using a certificate stored in a secure element on the charging station through a mutual transport layer security connection request. The systems described herein can include a charging system that includes a trusted platform module (TPM) that stores a certificate for authenticating the charging system with a cloud data processing system that is remote from the charging system. A data processing system of the charging system can integrate or interface with the TPM to retrieve the certificate and transmit the certificate to the cloud data processing system. The charger data processing system and the cloud data processing system can exchange credentials and can each authenticate or verify each other's credentials. The cloud data processing system can include a module, such as a hardware security module (HSM), that securely stores data (e.g., encryption keys, certificates, or other verification information) to verify the certificate. The cloud data processing system can send the certificate to the HSM for verification and the HSM can respond back to the cloud data processing system with an indication of whether the certificate is verified or not. The cloud data processing system can perform further authentication or verification, for example, based on a mapping between identifiers of charging systems (e.g., serial numbers) and certificates for the charging systems. The serial number of the charging system, or any other identifier of the charging system, can be included within or attached to the certificate. The cloud data processing system can extract the identifier. The cloud data processing system can extract the identifier of the charging system embedded in the received certificate. The cloud data processing system can identify the certificate issued for the charger based on the extracted identifier. The cloud data processing system can match the extracted identifier to identifiers stored by the cloud data processing system to identify the certificate issued for the charger. The cloud data processing system can determine whether the received certificate and the identified certificate match. The mapping can include manufacturing data that links serial numbers of chargers to certificates of the chargers. The HSM can store a map that associates, links, or relates an identifier of each charging system for a network of charging systems with the certificate for each charging system. The cloud data processing system can receive an identifier of the charging system. The identifier can be or include a unique identifier, a name, a pseudo-random number, a product identifier, serial number, or any other identifier. The HSM can use the map to verify or authenticate that the charging system making the request is associated with the provided certificate by authenticating both the certificate and the identifier, e.g., determining that the certificate is mapped to an identifier of the charging system.

At least one aspect is directed to a charging system to charge vehicles. The charging system includes at least one component to convey power to a vehicle to charge the vehicle. The charging system can include a module to store a certificate via a cryptographic technique. The charging system can include a data processing system coupled to the module, the data processing system including one or more processors, coupled with memory, to retrieve the certificate from the module. The data processing system can transmit, to a second data processing system, a request to establish a communication connection, the request including the certificate. The data processing system can establish the communication connection with the second data processing system responsive to a verification of the certificate by the second data processing system. The data processing system can transmit, to the second data processing system, data corresponding to power conveyed by the at least one component to the vehicle subsequent to verification of the certificate.

At least one aspect is directed to a system. The system can include a data processing system including one or more processors, coupled with memory, to receive a request from a second data processing system of a charging system, the request including a certificate secured in a hardware chip of the second data processing system. The data processing system can verify the certificate of the request with data stored by a module, the module configured to store and secure the data through at least one cryptographic technique. The data processing system can establish a communication connection with the second data processing system responsive to the verification of the certificate.

At least one aspect is directed to a method. The method can include storing, by a module of a charging system that conveys power to a vehicle, a certificate via at least one cryptographic technique. The method can include retrieving, by a data processing system of the charging system, the data processing system including one or more processors, coupled with memory, the certificate from the module. The method can include transmitting, by the data processing system to a second data processing system, a request to establish a communication connection, the request including the certificate. The method can include establishing, by the data processing system, the communication connection with the second data processing system responsive to the verification of the certificate by the second data processing system. The method can include transmitting, by the data processing system, data corresponding to power conveyed by the charging system to the vehicle subsequent to verification of the certificate.

At least one aspect is directed to a system. The system can include a data processing system including one or more processors, coupled with memory, to receive a request from a charging system, the request including the certificate and an identifier of the data processing system. The data processing system can identify, based on a map, a second certificate mapped to the identifier, the map including a plurality of mappings between certificates of charging systems and identifiers of the charging systems. The data processing system can verify the certificate received in the request based on the second certificate. The data processing system can establish the communication connection with the charging system responsive to the verification of the certificate with the second certificate.

At least one aspect is directed to a method. The method can include receiving, by a data processing system including one or more processors, coupled with memory, a request from charging system, the request including the certificate and an identifier of the data processing system. The method can include identifying, by the data processing system, based on a map, a second certificate mapped to the identifier, the map including a plurality of mappings between certificates of charging systems and identifiers of the charging systems. The method can include verifying, by the data processing system, the certificate received in the request based on the second certificate. The method can include establishing, by the data processing system, the communication connection with the charging system responsive to the verification of the certificate with the second certificate.

At least one aspect is directed to one or more computer readable medium storing instructions thereon, that, when executed by one or more processors, cause the one or more processors to receive a request from a charging system, the request including the certificate and an identifier of the data processing system. The instructions cause the one or more processors to identify, based on a map, a second certificate mapped to the identifier, the map including a plurality of mappings between certificates of charging systems and identifiers of the charging systems. The instructions can cause the one or more processors to verify the certificate received in the request based on the second certificate. The instructions can cause the one or more processors to establish the communication connection with the charging system responsive to the verification of the certificate with the second certificate.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
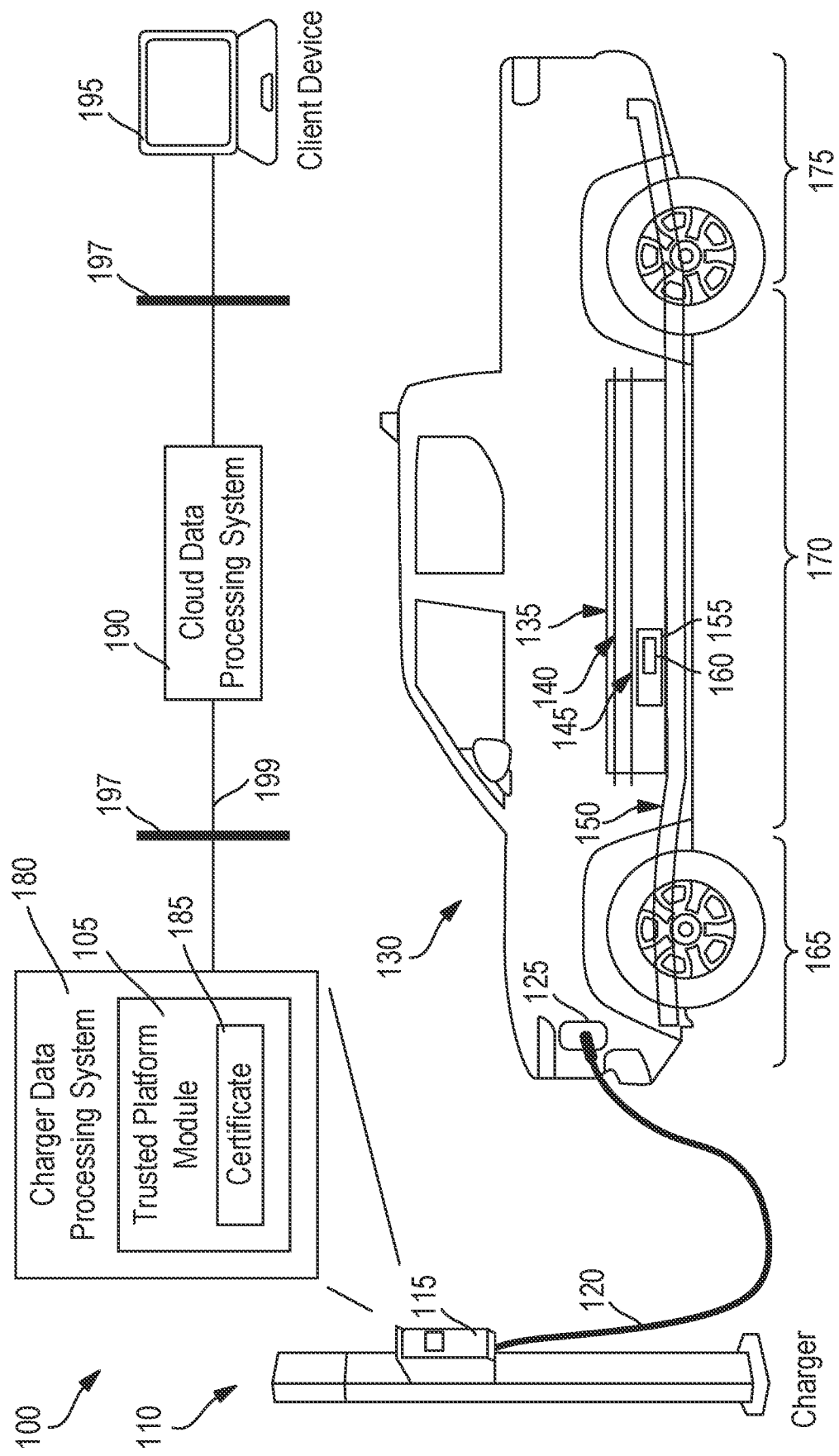
FIG. 1 depicts an example charging system where a charger data processing system of a charger includes a TPM.

Following below are more detailed descriptions of various concepts related to, and implementations of, methods, apparatuses, and systems of charging systems of vehicles. The various concepts introduced above and discussed in greater detail below may be implemented in any of numerous ways.

An aspect of this disclosure can be generally directed to providing a secure way to identify and verify a connection request that originates from a charging system (or charging station) using a certificate stored in a secure element on the charging station through a mutual transport layer security (TLS) connection request.

For example, the charging system can receive power from a power source (such as an energy grid, solar panel, wind turbine, another vehicle) and charge a battery of an electric vehicle. The charging system can include one or more data processing systems that communicate with at least one cloud data processing system. The charging system can transmit data packets, data elements, data files, or other data structures to the cloud data processing system. The data packets can include charging data, diagnostic data, maintenance data, or any other data collected or stored by the charging system. The charging system can receive remote commands from the cloud data processing system, e.g., commands to reset components of the charging system, install software updates, or other remote commands that remotely operate the charging system. The charging system can communicate with the cloud data processing system via a variety of communication protocols, for example, open charge point protocol (OCPP), a remote secure shell (SSH), a web-socket connection, or any other communication protocol.

The cloud data processing system can be a server system, a data processing system, a computing system, or any other computing device. A computing device of a third party can attempt to access the cloud data processing system by spoofing the charging system. For example, a cyber-attack can include spoofing an endpoint of the charging system and connecting with the cloud data processing system as the endpoint.

To solve these and other technical challenges, the systems described herein can include a charging system that includes a trusted platform module (TPM) that stores a certificate for authenticating the charging system with the cloud data processing system. A data processing system of the charging system can integrate with the TPM to retrieve the certificate and transmit the certificate to the cloud data processing system. The cloud data processing system can include a module, such as a hardware security module (HSM), that securely stores data (e.g., encryption keys, certificates, or other verification information) to verify the certificate. The cloud data processing system can send the certificate to the HSM for verification and the HSM can respond back to the cloud data processing system with an indication of whether the certificate is verified or not.

The cloud data processing system can perform further verification, for example, based on a mapping between identifiers of charging systems and certificates for the charging systems. The HSM can store a map that associates, links, or relates an identifier of each charging system for a network of charging systems with the certificate for each charging system. The cloud data processing system can receive an identifier of the charging system. The identifier can be or include a unique identifier, a name, a pseudo-random number, a product identifier, or any other identifier. The HSM can use the map to verify that the charging system making the request is associated with the provided certificate by determining that the certificate is mapped to an identifier of the charging system. This mapping between identifiers and certificates can detect situations where a third party removes a TPM from a charging system and uses the TPM in another charging system or device. Even if the TPM is removed and used in another device, the identifier of that device may not map to the identifier of the charging system that the TPM was removed from. Therefore, the HSM can use the mapping to detect situations where a third party is spoofing a charging system by using the TPM of the charging system in another device or system.

FIG. 1 depicts an example charging system 100 where a charger data processing system 180 of a charger 110 includes a TPM 105. The charging system 100 can include chargers 110 and cloud data processing systems 190. The charging system 100 can include components located within a single location, e.g., at a charging station. The charging system 100 can include components distributed across charging stations, chargers 110, cloud data processing systems 190, components of vehicles 130, applications for smartphones, or any other component. The charging system 100 can be a charging station, a parking lot charging station, a parking garage charging station, a single charging unit, a home charging system, a residential charging system. The charging system 100 can include at least one charger 110. The charger can include at least one component 115 to convey, transmit, or provide, power to at least one electric vehicle 130. The component 115 can be a power component that receives power from a power source and conveys the power to the vehicle 130 to charge a battery pack 135, a battery module 155, or a battery cell 160 of the vehicle 130. The component 115 can receive power from a power source such as an electric grid, a battery, a solar panel, a windmill, a nuclear power plant, or any other power source. The component 115 can perform power conversion, power regulation, power transformation, or any other operation. The component 115 can include filters, amplifiers, rectifiers, transformers, or a variety of other components.

The component 115 can provide power to the vehicle 130 via at least one connector 120. The connector 120 can be a cable, a harness, at least one wire, or other component that can provide the power to the vehicle 130. The component 115 can include a plug or other device that makes electrical connections with at least one charging port 125 of the vehicle 130. The charging port 125 can be a male or female connector that connect with a male or female connector of the connector 120. The charging port 125 and the connector 120 can make at least one positive, negative, ground, or data communication connection with the vehicle 130 between the component 115 and the vehicle 130 or the battery pack 135, the module 155, or the battery cell 160. The component 115 can convey power via the connector 120 and the charging port 125 to the vehicle 130 to charge the battery pack 135, the battery module 155, or the battery cell 160.

The component 115 can include at least one data processing system 180, such as a charger data processing system, a first data processing system, a computing system, a server system, a computing device, or other electrical computing component. The charger data processing system 180 can perform communication with at least one cloud data processing system 190, such as a cloud data processing system, a server system, a distributed processing network, a computing system, a server system, a computing device, or other electrical computing component. The charger data processing system 180 can be a first charger data processing system and the cloud data processing system 190 can be a second charger data processing system. The cloud data processing system 190 can be a first charger data processing system and the charger data processing system 180 can be a second charger data processing system. The charger data processing system 180 can communicate over at least one network 197 with the cloud data processing system 190. The charger data processing system 180 can transmit, publish, send, convey, or otherwise communicate data packets, data messages, files, commands, queries, data frames, data elements, data, or other pieces of information or data structure to the cloud data processing system 190. The charger data processing system 180 can receive data packets, data messages, files, commands, queries, data frames, data elements, data, or other pieces of information or data structures from the cloud data processing system 190. The cloud data processing system 190 can transmit, publish, send, convey, or otherwise communicate data packets, data messages, files, commands, queries, data frames, data elements, data, or other pieces of information or data structures to the charger data processing system 180. The cloud data processing system 190 can receive data packets, data messages, files, commands, queries, data frames, data elements, data, or other pieces of information from the charger data processing system 180. The network 197 can be or include a 4G network, a 5G network, a 6G network, a Wi-Fi network, a core network, a Local Area Network (LAN), a Wide Area Network (WAN), a Metropolitan Area Network (MAN), a Wi-Fi network, Bluetooth connection, or any combination thereof.

The charger data processing system 180 can include at least one module 105, such as a TPM 105. The TPM 105 can be a hardware component located separate from at least one processing component of the charger data processing system 180. The TPM 105 can be a hardware component integrated within at least one processing component of the charger data processing system 180. The TPM 105 can be a software module, software component, or otherwise a virtual module run by the at least one processing component of the charger data processing system 180. The TPM 105 can be or include a secure cryptographic-processor. The TPM 105 can be or include a microprocessor, a hardware chip, or processing system. The TPM 105 can include a secured input and output module that interfaces with other processing components of the charger data processing system 180. The TPM 105 can include a cryptographic processor configured to implement computer processes such as random number generation, hashing, encryption, decryption, signature generation, signature verification. The TPM 105 can include secured storage for storing at least one key, certificate, digital certificate, root value, encryption method, decryption method. The TPM 105 can securely store at least one certificate 185 via a cryptographic technique, e.g., encryption, hashing, a password, secured storage.

The digital certificate 185 can include metadata including an identify of the charger 110, an entity associated with the charger 110, a location of the charger 110, a model number of the charger 110. The digital certificate 185 can further include a public key of the charger 110. The public key of the charger 110 can be a key specific to the charger 110 and can be a public key of a public-private key pair of the charger 110. A certificate authority can sign the certificate 185 with a key, such as a private key, of the certificate authority. The certificate authority can generate a signature for the certificate 185 based on the metadata of the certificate 185 and the key of the certificate authority. The certificate authority can cause the certificate 185 to include the signature. The certificate 185 stored by the TPM 105 can be the signed certificate 185.

The charger data processing system 180 can establish at least one communication connection 199 with the cloud data processing system 190. The communication connection 199 can be, for example, a secure shell protocol (SSH) tunnel, a web-socket, an open charge point protocol (OCPP) connection, an open smart charging protocol (OSCP) connection, or a representational state transfer (REST) application programming interface (API). The charger data processing system 180 or the cloud data processing system 190 can establish one or multiple communication connections 199. The charger data processing system 180 can upload information to the cloud data processing system via the communication connection 199. The information can include maintenance data, performance history, aggregated performance metrics, or other pieces of information. The information can describe the performance of the charger 110 to charge vehicles 130. The information can describe number of vehicles 130 charged, amount of power conveyed to each vehicle 130, average amount of power conveyed to the vehicles 130, time of day or date that the charger 110 charged the vehicles 130, total amount of power conveyed to vehicles 130 per day, week, month, or year, for example.

The charger data processing system 180 can retrieve the certificate 185 from the TPM 105. At least one processor, processing module, microprocessor, or other computing device can be electrically coupled with the TPM 105 and allow the processor to communicate with the TPM 105. The charger data processing system 180 can generate, construct, build, or retrieve a request to establish the communication connection 199 with the cloud data processing system 190. The charger data processing system 180 can generate the request to include the certificate 185. The charger data processing system 180 can transmit, communicate, or send the request to the cloud data processing system 190. The cloud data processing system 190 can verify the authenticity of the certificate responsive to receiving the request.

Responsive to verifying the certificate, the charger data processing system 180 and the cloud data processing system 190 can establish the communication connection 199. Responsive to not verifying the certificate, the charger data processing system 180 and the cloud data processing system 190 can terminate the communication connection 199. For example, the cloud data processing system 190 can transmit a notification or indication of whether the certificate 185 has been verified or could not be verified. Responsive to receiving a notification or indication that the certificate 185 was verified by the cloud data processing system 190, the charger data processing system 180 can establish the communication connection 199. Responsive to receiving a notification or indication that the certificate 185 was not verified by the cloud data processing system 190, the charger data processing system 180 can terminate or end an existing communication connection 199.

The charger data processing system 180 and the cloud data processing system 190 can generate and store data that describes the communication connection 199, e.g., parameters for the connection 199, a duration for the connection 199, an identifier for the connection 199, port numbers, addresses, or other pieces of information for the connection 199. The charger data processing system 180 can transmit data to the cloud data processing system 190 responsive to the cloud data processing system 190 verifying the certificate 185. For example, responsive to the communication connection 199 being established, the charger data processing system 180 can transmit data to the cloud data processing system 190.

The charger data processing system 180 can transmit data to the cloud data processing system 190 via the communication connection 199, for example, diagnostic data, performance data, historic operation data, or other information that describes the performance, behavior, and health of the charger 110 conveying power to the vehicle 130. The data can indicate faults, errors, or other diagnostic indicators, total number of vehicles 130 charged, total amount of power conveyed to the vehicles 130, duration of time charging vehicles 130, or various other metrics collected or aggregated by the charger data processing system 180.

The charger data processing system 180 can receive an indication to convey power to the vehicle 130. The indication can be generated or received by the charger data processing system 180. The indication can be generated responsive to the connector 120 being plugged into the charging port 125 of the vehicle 130. The indication can be generated responsive to a user pressing a button on the charger 110. The indication can be generated responsive to a user sending a request to charge the vehicle 130 to the charger 110 via a smartphone, laptop, console of the vehicle 130, or other electronic device. The charger data processing system 180 can retrieve the certificate 185 from the TPM 105, transmit a request including the certificate 185, and establish the communication connection 199 with the cloud data processing system 190 responsive to the certificate 185 being verified by the cloud data processing system 190. The charger data processing system 180 can send data to the cloud data processing system 190 including a request to charge the vehicle 130. The request to charge the vehicle 130 can include an identifier of the vehicle 130, a name of an owner of the vehicle 130, a credential of the vehicle or an owner of the vehicle 130, a certificate of the owner, a certificate of the vehicle 130, a password associated with the owner, a password associated with the vehicle 130. The cloud data processing system 190 can receive the data and determine whether to authorize the charger 110 or the component 115 to charge the vehicle 130. The cloud data processing system 190 can transmit an authorization to the charger data processing system 180 to charge the vehicle 130. The cloud data processing system 190 can determine, based on the received information, whether or not the vehicles 130 belongs to a charging network and can be charged.

Responsive to the cloud data processing system 190 verifying the certificate and/or authorizing the request to charge the vehicle 130, the charger data processing system 180 can cause the component 115 to convey power to the vehicle 130 to charge the vehicle 130. The charger data processing system 180 can electrically control at least one switch, relay, triac, or other component that controls the flow of power to the electric vehicle 130. Responsive to the certificate 185 being verified by the cloud data processing system 190 or responsive to an authorization to charge the vehicle 130, the charger data processing system 180 can control the component 115 to convey power to the vehicle 130. Responsive to an indication that the certificate 185 is not verified or the vehicle 130 is not authorized to receive power from the charger 110, the charger data processing system 180 can terminate, stop, or prevent power from being conveyed by the component 115 to the vehicle 130. For example, the charger data processing system 180 can control the component 115 to terminate the component 115 from conveying power to the vehicle 130.

The charger data processing system 180 can control an amount of power that the component 115 conveys to the vehicle 130, a total amount of charge that the component 115 provides to the vehicle 130, or a rate at which the component 115 charges the vehicle 130 based on whether the certificate 185 of the charger data processing system 185 or a certificate 185 of the vehicle 130 is verified by the cloud data processing system 190. For example, if the certificate 185 is verified, the charger data processing system 180 can control the component 115 to convey a first amount of power to the vehicle 130. If the certificate 185 is not verified, the charger data processing system 180 can control the component 115 to convey a second amount of power, less than the first amount of power, to the vehicle 130. The charger data processing system 180 can implement charging techniques for enhanced charging based on whether the certificate 185 is verified. Instead of providing no power at all to the vehicle 130 when a certificate 185 of the vehicle 130 or a certificate 185 of the charger data processing system 190 is not verified, the charger 110 can still provide at least a some amount of power to charge the vehicle 130 to prevent the vehicle 130 from becoming stranded but still prevent unauthorized or unverified vehicles 130 or chargers 110 from utilizing the full charging capabilities of the charger 110.

For example, the cloud data processing system 190 can provide the charger data processing system 180 with instructions for charging the vehicle 130 in a rapid, efficient, enhanced, or smart manner. For example, the cloud data processing system 190 can store charging curves for battery pack 135, performance data of the battery pack 135, temperature of the battery pack 135, charging capabilities of the charger 110, or any other data of the vehicle 130 or data of the charger 110. The data can be received by the cloud data processing system 190 from the vehicle 130 or the charger data processing system 180. The cloud data processing system 190 can execute one or more computer algorithms, machine learning models, or other applications that identify charging decisions to implement efficient or rapid charging of the vehicle 130. The charging decisions can indicate a current level to provide to the vehicle 130, a voltage level to apply to the vehicle 130, an indication of the level of current over time, an indication of a level of the voltage over time, or any other indication. If the certificate 185 is verified, the cloud data processing system 190 can transmit the charging decisions to the charger data processing system 180 for the charger data processing system 180 to implement and thus enhance the charging that the component 115 performs. If the certificate 185 is not verified, the cloud data processing system 190 may not transmit the charging decisions to the charger data processing system 180 and the charger data processing system 180 may not implement any enhanced charging techniques.

The charger data processing system 180 can establish or re-establish the communication connection 199 based on a time interval or periodically. For example, the charger data processing system 180 can periodically transmit a request to establish the communication connection 199, the request including the certificate 185, to the cloud data processing system 190. The charger data processing system 180 can transmit the request 225 every five minutes, every hour, every data, every time a vehicle 130 attempts to charge at the charger 110. If the cloud data processing system 190 does not verify the certificate 185, the cloud data processing system 190 can send back an indication of the certificate 185 not being verified. Responsive to receiving the indication that the certificate 185 is not verified, the charger data processing system 180 can terminate the conveyance of power to the vehicle 130. Responsive to receiving the indication, the charger data processing system 180 can terminate an existing communication connection 199 with the cloud data processing system 190.

The cloud processing system 190 can establish a connection between at least one client device 195 with the charger data processing system 180 via the communication connection 199. The client device 195 can be a laptop, a desktop computer, a tablet, a smartphone, or any other computing system or device. The cloud processing system 190 can establish allow the client device 195 to remotely access the charger data processing system 180 via the communication connection 199. The client device 195, via the remote connection, can read data of the charger data processing system 180 or write data to the charger data processing system 180. For example, the client device 195 can read diagnostics metrics, performance metrics, or other metrics associated with the conveyance of power by the component 115 to the vehicle 130. For example, the client device 195 can transmit commands, an operating setting, an operating parameter, or other piece of control data to the charger data processing system 180. The data can cause the charger data processing system 180 to perform a power cycle, install software updates, change an amount of power that the component 115 conveys to the vehicle 130.

The electric vehicle 130 can be installed with at least one battery pack 135. Electric vehicles 130 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 135 can also be used as an energy storage system to power a building, such as a residential home or commercial building. Electric vehicles 130 can be fully electric or partially electric (e.g., plug-in hybrid) and further, electric vehicles 130 can be fully autonomous, partially autonomous, or unmanned. Electric vehicles 130 can also be human operated or non-autonomous. Electric vehicles 130 such as electric trucks or automobiles can include on-board battery packs 135, batteries 160 or battery modules 155, or battery cells 160 to power the electric vehicles. The electric vehicle 130 can include a chassis 150 (e.g., a frame, internal frame, or support structure). The chassis 150 can support various components of the electric vehicle 130. The chassis 150 can span a front portion 165 (e.g., a hood or bonnet portion), a body portion 170, and a rear portion 175 (e.g., a trunk, payload, or boot portion) of the electric vehicle 130. The battery pack 135 can be installed or placed within the electric vehicle 130. For example, the battery pack 135 can be installed on the chassis 150 of the electric vehicle 130 within one or more of the front portion 165, the body portion 170, or the rear portion 175. The battery pack 135 can include or connect with at least one busbar, e.g., a current collector element. For example, the first busbar 140 and the second busbar 145 can include electrically conductive material to connect or otherwise electrically couple the battery 160, the battery modules 155, or the battery cells 160 with other electrical components of the electric vehicle 130 to provide electrical power to various systems or components of the electric vehicle 130.

Figure 2:
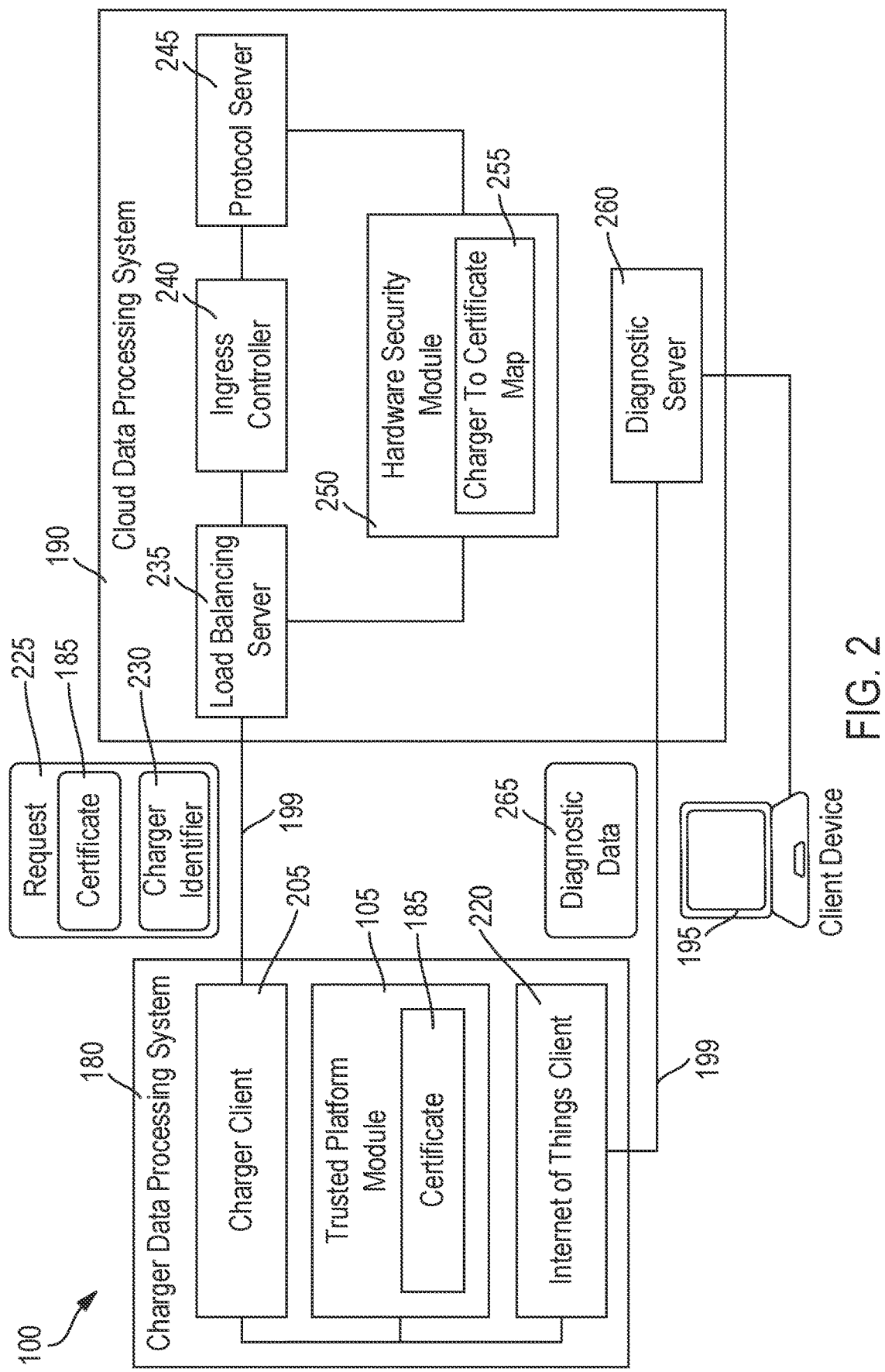
FIG. 2 depicts an example charging system where a charger data processing system transmits a request to a cloud data processing system to authenticate the charger data processing system.

FIG. 2 depicts the example charging system 100 where the charger data processing system 180 transmits at least one request 225 to the at least one cloud data processing system 190 to authenticate the charger data processing system 180. The charger data processing system 180 can include a charger client 205 and an Internet of Things (IoT) client or agent 220. The client 205 and the client 220 can be or include software modules, software applications, code, or other software elements that can be stored and executed by the charger data processing system 180. The charger client 205 can implement a charger specific communication protocol. For example, the communication protocol can be a standardized communication protocol or a proprietary communication protocol. For example, the communication protocol can be OCPP or OSCP. The IoT client 220 can be a client or agent that facilitates IoT based communication via an IoT based protocol. The IoT based protocol can be a publish-subscribe based protocol where the IoT client 220 publishes messages to topic and a broker communicates the message to subscribing clients that subscribe to the topic. Similarly, the IoT client 220 can subscribe to topics and receive, via the For example, the IoT client 220 can implement message queuing telemetry transport (MQTT).

The client 205 or the client 220 can establish a communication connection 199 with the cloud data processing system 190. For example, the client 205 can establish a first communication connection 199 in a first communication protocol with the cloud data processing system 190. The client 205 or the client 220 can retrieve the certificate 185 from the TPM 105 and construct, generate, build, or create the request 225. The request 225 can be at least one message, at least one data packet, at least one data frame, at least one javascript object notation (JSON) data element, at least one data element, or any other data structure or piece of information. The request 225 can allow the charger data processing system 180 to transmit the certificate 185 to the cloud data processing system 190 for authentication or verification. The charger data processing system 180 and the cloud data processing system 180 can transmit requests 225 to each other to exchange digital certificates for authentication or verification. The cloud data processing system 180 can verify or authenticate the certificate 185 and the charger identifier 230 before allowing any incoming data from the charger data processing system 180 to be received or stored by the cloud data processing system 180.

The client 205 can generate a first request 225. The client 220 can generate a second request 225. The client 205 or the client 220 can cause the request 225 to include the certificate 185. The client 205 or the client 220 can cause the request 225 to include at least one identifier 230. The identifier 230 can be a charger identifier 230 identifying charger 110. The identifier 230 can be a model number, a serial number of the charger 110, a unique identifier, a hash value, a geographic coordinate of the charger 110, or any other identifying information. The identifier 230 can be stored by the data processing system 180, the charger client 205, the TPM 105, or the client 220. The identifier 230 can be stored in a storage device separate from the TPM 105 such that if the TPM 105 is removed and placed in another charger 110, the identifier 230 will not be an identifier 230 that corresponds to a certificate 185 stored by the TPM 105.

The client 205 can transmit a first request 225 to the load balancing server 235 and receive, from the protocol server 245, an indication of whether the certificate 185 of the first request 225 is verified. Responsive to receiving an indication that the certificate 185 is verified, the client 205 can create a first communication connection 199 and communicate with the protocol server 245 via the first communication connection 199. Responsive to receiving an indication that the certificate 185 is verified, the client 220 can create a second communication connection 199 and communicate with the diagnostic server 260 via the second communication connection 199.

The charger data processing system 180 can transmit the request 225 to the cloud data processing system 190. The request 225 can be a request to establish one or more communication connections 199. A server 235 can receive the request 225 from the charger data processing system 180. The server 235 can be a load balancing server, first server, etc. The server 235 can be a component of the cloud data processing system 190, e.g., a physical computing system or a software component instantiated and run by on hardware of the cloud data processing system 190. For example, the server 235 can load balance requests 225 received from multiple different charger data processing systems 180. The load balancing server 235 can verify the certificate 185 with data with data stored on a HSM 250 of the cloud data processing system 190. The load balancing server 235 can verify the certificate 185 through communicating with the HSM 250. The load balancing server 235 can verify the request by transmitting the certificate 185 and a request to verify the certificate 185 to the HSM 250 to verify the request 225.

The HSM 250 can be a physical computing system that is separate from, or integrated with, the cloud data processing system 190. The HSM 250 can be a physical module that is separate from the cloud data processing system 190, the server 235, an ingress controller 240, and a protocol server 245. The HSM 250 can be communicably coupled via at least one electrical connection to at least one processor of the cloud data processing system 190, the server 235, the ingress controller 240, or the server 245. The HSM 250 can include at least one cryptographic processor or at least one secured storage device. The HSM 250 can store asymmetric or symmetric keys, certificates, passwords, perform encryption, perform decryption, or perform certificate verification. The cloud processing system 190, the server 235, or the server 245 can send cryptographic requests to the HSM 250 and the HSM 250 can respond to the requests with the requested data, e.g., encrypted information, decrypted information, an indication of a verification of information, an indication of authentication, etc. This can allow the cloud processing system 190, the server 235, or the server 245 to verify information without actually storing or accessing keys, certificates, or other private or sensitive information.

The HSM 250 can verify the authenticity of the certificate 185 based on data stored by the HSM 250. For example, the HSM can store a public key of a certificate authority that signed the certificate 185 and verify a signature of the certificate 185 with the public key. The HSM 250 can store a duplicate copy of the certificate 185 (a second certificate) and verify the received certificate 185 with a stored copy of the certificate 185. The HSM 250 can store a list of valid certificates and compare the received certificate 185 against the stored valid certificates to verify that one of the certificates matches the received certificate 185. The HSM 250 can respond to the load balancing server 235 with an indication of whether the certificate 185 is verified. The indication can be a binary value indicating whether the certificate 185 is verified or not by the HSM 250.

The load balancing server 235, responsive to verifying the certificate 185, can pass the request 225 to the ingress controller 240. The ingress controller 240 can handle requests for establishing the communication connection 199 and pass the request 225 to the protocol server 245. The protocol server 245 can establish the communication connection 199. The protocol server 245 can establish the communication connection 199 responsive to the load balancing server 235 verifying the certificate 185 and in response to another verification of the certificate by the protocol server 245. For example, the protocol server 245 can verify the request 225 based on the charger identifier 230 included within the request 225. The protocol server 245 can verify the certificate 185 by communicating with the HSM 250. For example, the protocol server 245 can transmit a request to verify the certificate 185 along with the certificate 185 and the charger identifier 230 to the HSM 250. The HSM 250 can verify the certificate 185 based on the charger identifier 230 and respond to the protocol server 245 with an indication of whether the certificate 185 is valid or not.

The HSM 250 can verify the certificate 185 with data stored by the HSM 250 and a charger to certificate map 255. The charger to certificate map 255 can include relationships or links between identifiers of chargers 110 and the corresponding data for verifying the certificates 185 of the chargers 110. The HSM 250 can use the corresponding data to verify the certificate 185. For example, the corresponding data can include a key to verify the particular certificate 185, a copy of the certificate 185, or any other data that the HSM 250 can use to verify a particular certificate 185. The HSM 250 can identify, based on the map 255, a second certificate mapped to the identifier 230, the map 255 including mappings between certificates of charging systems and identifiers of the charging systems. The HSM 250 can use the map 255 to locate the data for verifying the certificate 185 based on the identifier 230. The HSM 250 can compare the identifier 230 to identifiers of the map 255 to identify a matching identifier, and select the data linked by the map 255 to the identified identifier. The HSM 250 can use the selected data to verify the certificate 185 and determine whether the certificate is valid or not. For example, the HSM 250 can use the map 255 to identify a copy of the certificate 185 mapped to the identifier 230. The HSM 250 can compare the copy of the certificate 1985 to the received certificate 185. If the certificates 185 match, the HSM 250 can generate an indication that the certificate 185 is verified. If the certificates do not match, the HSM 250 can generate an indication that the certificates 185 are not verified. The HSM 250 can communicate the result of the verification to the protocol server 245.

The protocol server 245 can, responsive to a detection that the certificate 185 is verified by at least one of the load balancing server 235 or the protocol server 245, establish the communication connection 199 (e.g., an SSH connection, an MQTT connection, a web-socket connection, an OCPP connection, or an OSCP connection) with the charger data processing system 180. The protocol server 245 can generate and store data that describes the communication connection 199, e.g., parameters for the connection 199, a duration for the connection 199, an identifier for the connection 199, port numbers, addresses, or other pieces of information for the connection 199. The protocol server 245 can communicate with the charger client 205 via a protocol such as an SSH protocol, an MQTT protocol, a web-socket protocol, an OCPP protocol, or an OSCP protocol.

The client 205 or the client 220 can receive an indication from the load balancing server 235 or the protocol server 245 that the certificate 185 is verified, e.g., that the load balancing server 235 and/or the protocol server 245 have verified the certificate 185. The client 205 or the client 220 can receive an indication from the load balancing server 235 or the protocol server 245 that the certificate 185 is not verified, e.g., that the load balancing server 235 and/or the protocol server 245 have not verified the certificate 185. The client 205 or the client 220 can establish the communication connection 199 responsive to receiving the indication that the certificate 185 is verified. The client 205 can establish a first communication connection 199 to communicate with the protocol server 245 via a first communication protocol. The client 220 can establish a second communication connection 199 to communicate with a diagnostic server 260 via a second communication protocol. The first communication protocol and the second communication protocol can be different types of communication protocols. The client 205 or the client 220 can establish a communication connection 199 (e.g., an SSH connection, an MQTT connection, a web-socket connection, an OCPP connection, or an OSCP connection) with the charger data processing system 180. The client 205 or the client 220 can generate and store data that describes the communication connection 199, e.g., parameters for the connection 199, a duration for the connection 199, an identifier for the connection 199, port numbers, addresses, or other pieces of information for the connection 199. The client 205 can communicate with the protocol server 245 via a protocol such as an SSH protocol, an MQTT protocol, a web-socket protocol, an OCPP protocol, or an OSCP protocol. The client 220 can communicate with the diagnostic server 260 via a protocol such as an SSH protocol, an MQTT protocol, a web-socket protocol, an OCPP protocol, or an OSCP protocol.

The cloud data processing system 190 can include at least one diagnostic server 260. The diagnostic server 260 can perform diagnostic operations for the charger 110. The diagnostic server 260 can receive diagnostic data 265 including a description of a performance of the at least one component to charge the vehicle. The client 220 can collect charging data of the charger 110. The charging data can indicate the number of vehicles 130 that have charged at the charger 110 over a period of time, an amount of power that the charger 110 has conveyed to vehicles 130, an amount of time that the charger 110 has spent in a charging state, indications of faults or errors identified by the charger data processing system 180, or any other piece of information describing characteristics, behavior, or status of the charger 110 charging the vehicle 130. The client 220 can compile the collected information of the charger 110 into the diagnostic data 265. The client 220 can communicate the diagnostic data 265 to the diagnostic server 260 responsive to the certificate 185 being verified by the cloud data processing system 190 or responsive to the communication connection 199 being established.

The diagnostic server 260 can receive the diagnostic data 265 from the client 220. The diagnostic server 260 can generate dashboards, user interfaces, graphical user interfaces, or other information based on the diagnostic data 265. The diagnostic server 260 can periodically receive the diagnostic data 265 from the client 220 and aggregate the diagnostic data 265. The aggregated diagnostic data 265 can be presented in the graphical user interfaces and displayed to a user on the client device 195. The graphical user interface for the charger 110 can be displayed on the client device 195 responsive to at least one of the cloud data processing system 190 verifying the certificate 185 or the cloud data processing system 190 establishing the communication connection 199.

The diagnostic server 260 can provide the client device 195 with remote access to the charger data processing system 180 via the communication connection 199 responsive to at least one of the cloud data processing system 190 verifying the certificate 185 or the cloud data processing system 190 establishing the communication connection 199 with the client 220. The client device 195 can review or read data stored by the charger data processing system 180 via the remote access. The client device 195 can transmit at least one command, at least one operating setting, at least one operating parameter, or other piece of control data to the diagnostic server 260. The diagnostic server 260 can transmit the data received from the client device 195 to the client 220 responsive to receiving the data from the client device 195. The data can cause the charger data processing system 180 to perform a power cycle, install software updates, change an amount of power that the component 115 conveys to the vehicle 130, or operations.

The diagnostic server 260 can receive a request for remote access to the charger data processing system 180 from the client device 195. The request can be a request to send commands to the charger data processing system 180, a request to read data of the charger data processing system 180, or a request for remote access to the charger data processing system 180. Responsive to receiving the request, the diagnostic server 260 can send a request to establish the communication connection 199 with the charger data processing system 180. The charger data processing system 180 can respond to the cloud data processing system 190 with the request 225. The client 220 can receive the request from the diagnostic server 260, generate the request 225, and transmit the request 225 to the diagnostic server 260. The diagnostic server 260 can communicate with the HSM 250 to verify the certificate 185 of the request 225. The diagnostic server 260 can perform the operations of the load balancing server 235 or the protocol server 245 to verify the certificate 185 with the HSM 250. Responsive to verifying the certificate 185, the diagnostic server 260 and the client 220 can establish the communication connection 199. Responsive to verifying the certificate 185, the diagnostic server 260 and the client 220 can allow the client device 195 to remotely access the charger data processing system 180.

Figure 3:
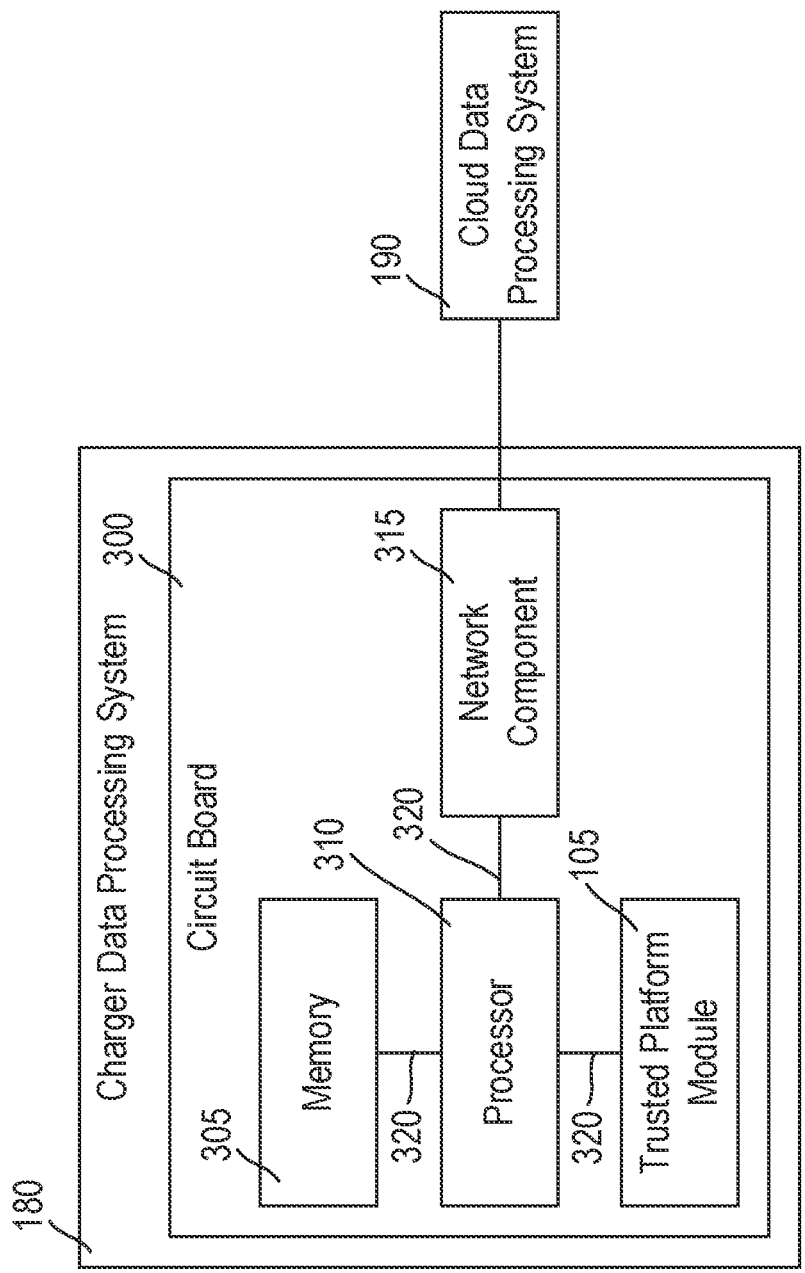
FIG. 3 depicts an example charger data processing system including a circuit board that connects at least one processor with a TPM.

FIG. 3 depicts the example charger data processing system 180 including a circuit board 300 that connects at least one processor 310 with at least one TPM 105. The circuit board 300 can be a printed circuit board (PCB), a printed wiring board (PWB), or any other type of circuit board. One or multiple components can be mounted on, connected to, or otherwise coupled to the circuit board 300. The components can be or include the memory 305, the processor 310, the TPM 105, or the network component 315. For example, at least one memory 305, at least one processor 310, at least one network component 315, at least one TPM 105 can be mounted, connected, or coupled to the circuit board 300. The components can include microchips, integrated circuits, or other devices or systems. The components of the circuit board 300 can be connected to each other through connections 320. The connections 320 can be electrical traces in the circuit board 300, wires, solder joints, busses, connectors, or any other electrical connection. Via the electrical connections 320, the processor 310 can retrieve information from the TPM 105, e.g., retrieve the certificate 185 from the TPM 105.

The at least one processor 310 can be coupled to the TPM 105 via at least one electrical connection 320. The processor 310 can be or include a microcontroller, a central processing unit (CPU), a graphics processing unit (GPU), an application specific integrated circuit (ASIC), a logic circuit, or any other component that processes data. The processor 310 can execute software instructions stored by the memory 305, e.g., the client 205 or the client 220. The memory 305 can be read only memory (ROM), random access memory (RAM), a solid state hard (SSD) drive, a hard disk drive (HDD), or any other storage or memory component. The memory 305 can store instructions that the processor 310 can execute. The processor 310 can execute instructions that cause the processor 310 to retrieve the certificate 185 from the TPM 105. The processor 310 can retrieve the certificate 185 via the electrical connection 320. The processor 310 can execute instructions to generate the request 225 based on the retrieved certificate 185. The processor 310 can communicate the request 225 to the network component 315 via another electrical connection 320. The network component 315 can transmit the request to the cloud data processing system 190 via the communication connection 199. The network component 315 can be or include a transmitter, receiver, transceiver, radio module, front end module, or any other component for communicating with the cloud data processing system 190 via the network 197.

Figure 4:
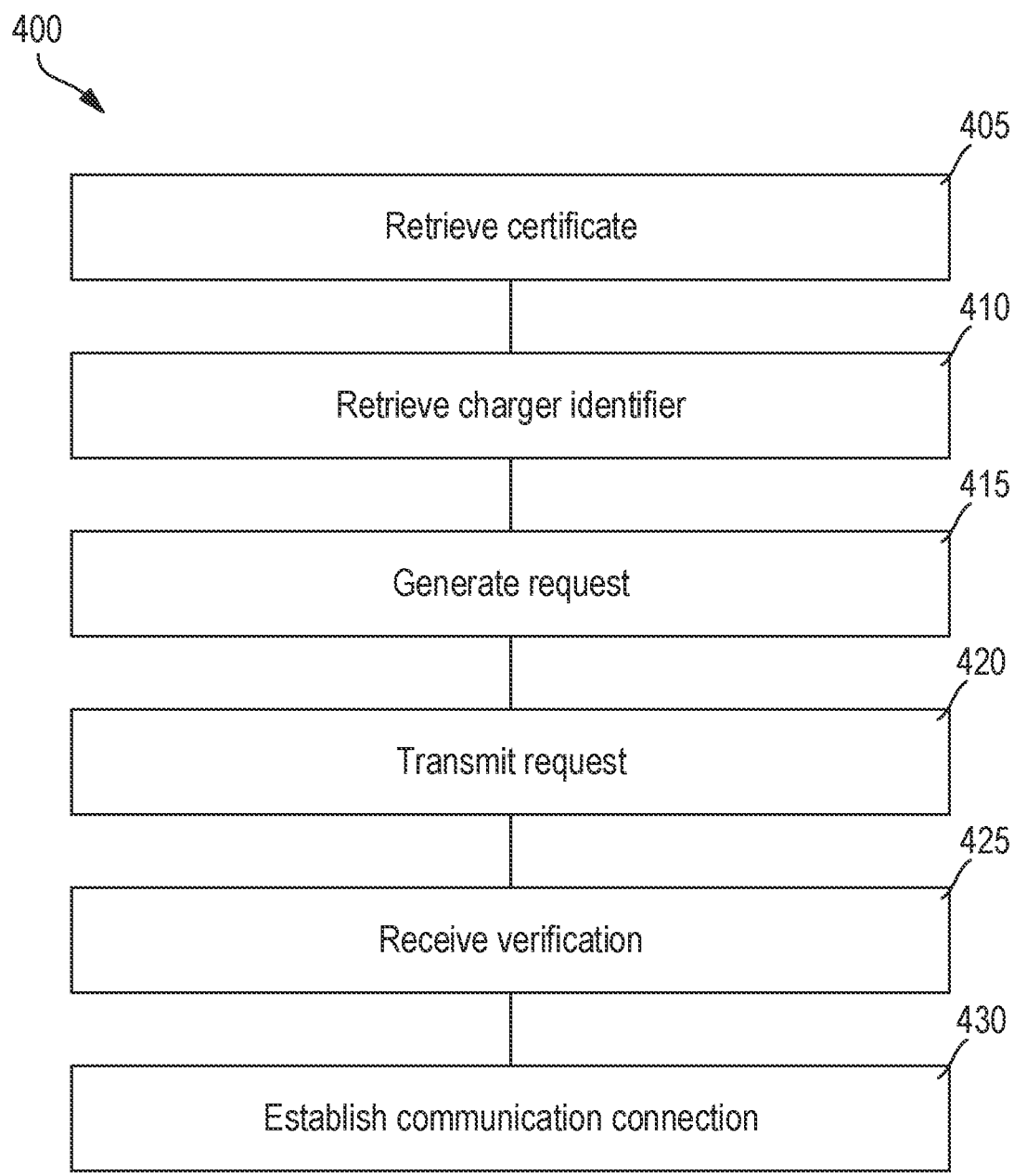
FIG. 4 is an example method of generating a request to establish a communication connection for validation by a cloud data processing system.

FIG. 4 is an example method 400 of generating a request for validation by a cloud data processing system 190. At least one ACT of the method 400 can be performed by the charger data processing system 180. At least one ACT of the method 400 can be performed by the charger client 205, the TPM 105, the IoT client 220. The method 400 can include an ACT 405 of retrieving a certificate. The method 400 can include an ACT 410 of retrieving a charger identifier. The method 400 can include an ACT 415 of generating a request. The method 400 can include an ACT 420 of transmitting a request. The method 400 can include an ACT 425 of receiving a verification. The method 400 can include an ACT 430 of establishing a communication connection.

The method 400 can include an ACT 405 of retrieving, by the charger data processing system 180, at least one certificate 185. The charger data processing system 180 can retrieve the certificate 185 from at least one TPM 105 of the charger data processing system 180. At least one processor 310 of the charger data processing system 180 can be communicably coupled with the TPM 105 via at least one electrical connection 320. The processor 310 can retrieve the certificate 185 from the TPM 105 via the electrical connection 320. For example, the processor 310 can execute the client 205. The client 205, when executed by the processor 310, can cause the processor 310 to retrieve the certificate 185 from the TPM 105. For example, the processor 310 can execute the client 220.

The method 400 can include an ACT 410 of retrieving, by the charger data processing system 180, at least one charger identifier 230. The charger data processing system 180 can store the charger identifier 230 on a storage or memory device, such as the memory 305. The charger data processing system 180 can retrieve the charger identifier 230 from the storage or memory device. The charger identifier 230 can provide a unique identification of the charger 110, the charger data processing system 180, the client 205, or the client 220. The charger identifier 230 can be an alphanumeric string, a text string, a number string, a name, a product number, a hash value, or any other unique identifier for the charger 110.

The method 400 can include an ACT 415 of generating, by the charger data processing system 180, at least one request 225. The charger data processing system 180 can generate the request 225 to include an indication to establish a communication connection 199, the certificate 185 retrieved at the ACT 405, the charger identifier 230 retrieved at the ACT 410, or any other metadata or information. The request 225 can be a data packet, at least one data frame, a data element, a message, or any other data structure. The client 205 or the client 220 can generate the request 225. For example, the client 205 can generate a first request 225 to establish a first communication connection 199 in a first communication protocol. The client 220 can generate a second request 225 to establish a second communication connection 199 in a second communication protocol. The first protocol and the second protocol can be different communication protocols.

The method 400 can include an ACT 420 of transmitting, by the charger data processing system 180, the request 225. For example, the charger data processing system 180 can transmit the request 225 to the cloud data processing system 190. The charger data processing system 180 can transmit the request 225 to the cloud data processing system 190 via the network 197. For example, the client 205 can transmit a first request 225 to the cloud data processing system 190. The client 220 can transmit a second request 225 to the cloud data processing system 190.

The method 400 can include an ACT 425 of receiving, by the charger data processing system 180, a verification. The verification can be a message, an indicator, a data packet, at least one data frame, or any other indication that a piece of information has been verified. The verification can indicate that the request 225 has been granted or that the certificate 185 has been verified. The charger data processing system 180 can receive the verification from the cloud data processing system 190. For example, the charger data processing system 180 can generate the verification or a message to indicate whether or not that certificate 185 has been verified or has not been verified by the cloud data processing system 190. The cloud data processing system 190 can transmit the verification to the charger data processing system 180. The client 205 can receive a verification of the first request 225 from the cloud data processing system 190, e.g., the load balancing server 235 or the protocol server 245. The client 220 can receive a verification of the second request 225 from the diagnostic server 260.

The method 400 can include an ACT 430 of establishing, by the charger data processing system 180, a communication connection 199. The charger data processing system 180 can establish the communication connection 199 responsive to receiving the indication from the cloud data processing system 190 that the certificate 185 is verified. The charger data processing system 180 can establish the communication connection 199 responsive to receiving the indication from the cloud data processing system 190 that the certificate 185 is verified at ACT 425. The charger data processing system 180 can establish the communication connection 199 by storing data describing the communication connection 199 or data used to implement that communication connection 199. The charger data processing system 180 can establish the communication connection 199 by transmitting and receiving data packets, data messages, or data frames based on the data describing the communication connection 199. The data describing the communication connection 199 can include parameters for the connection 199, a duration for the connection 199, an identifier for the connection 199, port numbers, addresses, or other pieces of information for implementing the connection 199.

Figure 5:
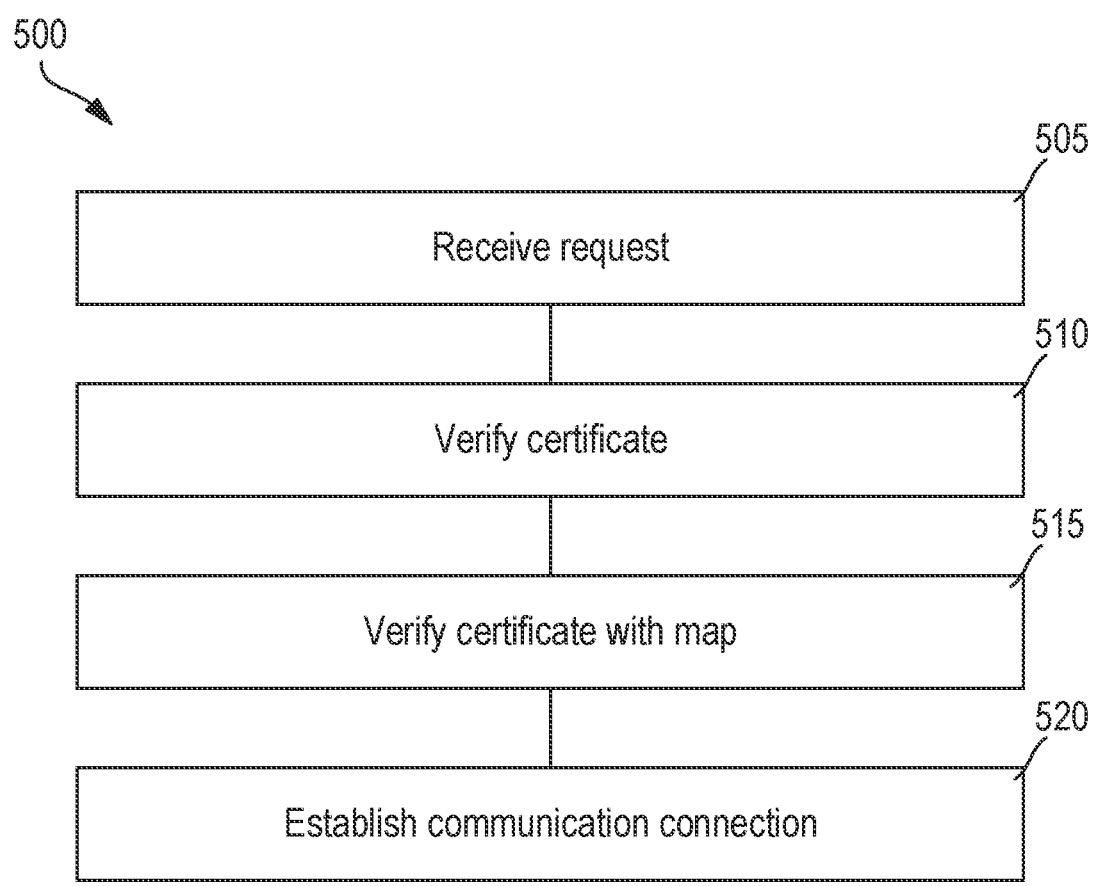
FIG. 5 is an example method of verifying a certificate of a charger data processing system to establish a communication connection.

FIG. 5 is an example method 500 of verifying a certificate 185 of a charger data processing system 180. At least one ACT of the method 500 can be performed by the cloud data processing system 190. At least one ACT of the method 500 can be performed by the load balancing server 235, the ingress controller 240, the protocol server 245, the HSM 250, or the diagnostic server 260. The method 500 includes an ACT 505 of receiving a request. The method 500 can include an ACT 510 of verifying a certificate. The method 500 can include an ACT 515 of verifying a certificate with a map. The method 500 can include an ACT 520 of establishing a communication connection.

The method 500 can include an ACT 505 of receiving, by the cloud data processing system 190, at least one request 225. The cloud data processing system 190 can receive the request 225 from the charger data processing system 180. The request 225 can be a request to establish, initiate, or begin a communication connection 199 between the charger data processing system 180 and the cloud data processing system 190. The request 225 can be received by the cloud data processing system 190 from the charger client 205, the IoT client 220, or any other component of the charger data processing system 180. The cloud data processing system 190 can extract information from the request 225. For example, the cloud data processing system 190 can extract the certificate 185 or the charger identifier 230 from the request 225.

The method 500 can include an ACT 510 of verifying, by the cloud data processing system 190, the certificate 185. The cloud data processing system 190 can verify the certificate 185 received in the request 225. For example, the load balancing server 235 can receive the request 225 and can send the certificate 185 and a request to verify the certificate 185 to the HSM 250. The HSM 250 can store data that the HSM 250 can use to verify the certificate 185. The HSM 250 can use a key, copies of authentic or valid certificates 185, or other information to verify the certificate 185. Responsive to verifying the certificate, the load balancing server 235 can communicate an indication of the verification to the protocol server 245.

The method 500 can include an ACT 515 of verifying, by the cloud data processing system 190, the certificate 185 with the map 255. The method 500 can include performing ACT 515 in place of ACT 510. The method 500 can include performing ACT 515 responsive to ACT 510 verifying the certificate 185. The method 500 can include performing ACT 510 responsive to ACT 515 verifying the certificate 185. In ACT 515, the cloud data processing system 190 can verify the certificate 185 with the map 255. For example, the cloud data processing system 190 can compare the charge identifier 230 to identifiers of the map 255. Each identifier of the map 255 can identify a specific charger 110. The map 255 can relate each identifier to a particular certificate associated with the charger 110. The cloud data processing system 190 can compare the certificate 185 to the certificate of the map 255 that the cloud data processing system 190 identifies with the charger identifier 230. The protocol server 245 can send a request to verify the certificate 185 to the HSM 250 with the charger identifier 230. The HSM 250 can verify the certificate 185 based on the map 255. The HSM 250 can respond to the HSM 250 with an indication of whether the certificate 185 is verified.

The method 500 can include an ACT 520 of establishing, by the cloud data processing system 190, a communication connection 199. The cloud data processing system 190 can establish the communication connection 199 responsive to the certificate 185 being verified. The cloud data processing system 190 can establish the communication connection 199 responsive to the certificate 185 being verified at the ACT 510. The cloud data processing system 190 can establish the communication connection 199 responsive to the certificate 185 being verified at the ACT 515. The cloud data processing system 190 can establish the communication connection 199 responsive to the certificate 185 being verified at the ACT 510 and the ACT 515. The cloud data processing system 190 can establish the communication connection 199 by storing data describing the communication connection 199 or storing data used by the cloud data processing system 190 to implement the communication connection 199. The cloud data processing system 190 can establish the communication connection 199 by transmitting and receiving data packets, data messages, or data frames based on the data describing the communication connection 199. The data describing the communication connection 199 can include parameters for the connection 199, a duration for the connection 199, an identifier for the connection 199, port numbers, addresses, or other pieces of information for implementing the connection 199.

Figure 6:
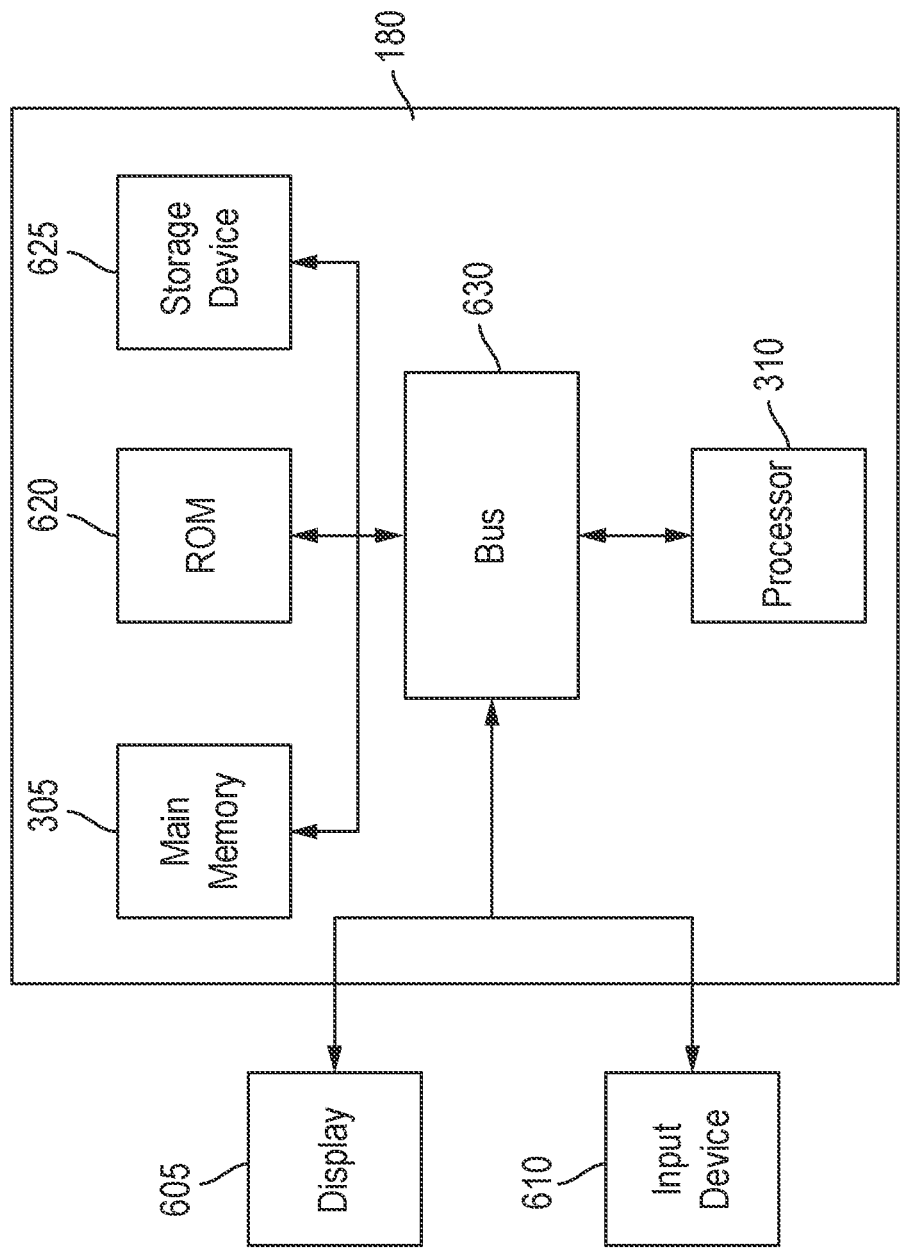
FIG. 6 is a block diagram depicting an architecture for a data processing system that can be employed to implement elements of the systems and methods described and illustrated herein.

FIG. 6 depicts an example block diagram of an example data processing system 180. The data processing system, computer system, or computing device described with respect to FIG. 6 can include or be used to implement a data processing system or its components, such as the data processing system 180 or the data processing system 190. The data processing system 180 can include at least one bus 630 or other communication component for communicating information and at least one processor 310 or processing circuit coupled to the bus 630 for processing information. The bus 630 can be or include the electrical connections 320. The data processing system 180 can also include one or more processors 310 or processing circuits coupled to the bus for processing information. The data processing system 180 also includes at least one main memory 305, such as a random access memory (RAM) or other dynamic storage device, coupled to the bus 630 for storing information, and instructions to be executed by the processor 310. The main memory 305 can be used for storing information during execution of instructions by the processor 310. The data processing system 180 may further include at least one read only memory (ROM) 620 or other static storage device coupled to the bus 630 for storing static information and instructions for the processor 310. A storage device 625, such as a solid state device, magnetic disk or optical disk, can be coupled to the bus 630 to persistently store information and instructions.

The data processing system 180 may be coupled via the bus 630 to a display 605, such as a liquid crystal display, or active matrix display, for displaying information to a user such as a driver of the electric vehicle 130 or other end user. An input device 610, such as a keyboard or voice interface may be coupled to the bus 630 for communicating information and commands to the processor 310. The input device 610 can include a touch screen display 605. The input device 610 can also include a cursor control, such as a mouse, a trackball, or cursor direction keys, for communicating direction information and command selections to the processor 310 and for controlling cursor movement on the display 605.

The processes, systems and methods described herein can be implemented by the data processing system 180 in response to the processor 310 executing an arrangement of instructions contained in main memory 305. Such instructions can be read into main memory 305 from another computer-readable medium, such as the storage device 625. Execution of the arrangement of instructions contained in main memory 305 causes the data processing system 190 to perform the illustrative processes described herein. One or more processors in a multi-processing arrangement may also be employed to execute the instructions contained in main memory 305. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims.

Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the security techniques described herein can be applied to charger-vehicle communication. For example, a vehicle data processing system can include a TPM that stores a digital certificate for a vehicle. The vehicle can retrieve the certificate from the TPM and transmit a request including the certificate and an identifier of the vehicle to a charger data processing system of a charger that charges the vehicle. The charger data processing system can include a TPM or HSM that stores data for verifying the certificate, such as a key, copy of the certificate, or vehicle identifier to certificate map. The charger data processing system can verify the certificate received from the vehicle. The vehicle identifier to certificate map can store relationships between unique identifiers of vehicles and the certificate of the vehicle. The charger data processing system can identify an identifier of the map by matching the received identifier to the map and select a certificate of the map linked to the identifier. The charger data processing system can compare the receive certificate to the selected certificate to verify that the certificates match. The charger data processing system can verify the certificate and establish a communication connection with the vehicle data processing system of vehicle responsive to verifying the certificate. The charger data processing system can cause the charger, or at least one component of the charger, to convey power to charge the vehicle responsive to the certificate being verified. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A charging system to charge vehicles, comprising:
   an electrical connector to convey power to a vehicle to charge the vehicle;
   a trusted platform module to store a certificate of the charging system via a cryptographic technique; and
   one or more processors, coupled with memory, to:
      retrieve the certificate from the trusted platform module;
      generate a request message including an identifier of the charging system and the certificate;
      transmit the request message to a remote computing system to establish a communication connection;
      establish the communication connection with the remote computing system responsive to a first verification, by the remote computing system, that the certificate is authentic and a second verification that the certificate is mapped to the identifier via mapping data that links certificates associated with identifiers of charging systems; and
      responsive to the first verification that the certificate is authentic and the second verification that the certificate is mapped to the identifier, transmit, to the remote computing system, data corresponding to power conveyed by the electrical connector to the vehicle.

2. The charging system of claim 1, comprising the one or more processors to:
   receive an indication to convey the power to the vehicle;
   retrieve the certificate from the trusted platform module responsive to a reception of the indication; and
   authorize, responsive to the first verification and the second verification of the certificate, the electrical connector to convey power to the vehicle.

3. The charging system of claim 1, comprising the one or more processors to:
   receive an indication to convey the power to the vehicle;
   retrieve the certificate from the trusted platform module responsive to a reception of the indication; and
   terminate, responsive to an indication that the certificate is not verified, conveyance of power to the vehicle.

4. The charging system of claim 1, comprising the one or more processors to:
   receive an indication to convey the power to the vehicle;
   retrieve the certificate from the trusted platform module responsive to a reception of the indication; and
   terminate, responsive to an indication that the certificate is not verified, the communication connection.

5. The charging system of claim 1, comprising:
   a circuit board comprising:
      the one or more processors coupled with the memory to:
         retrieve the certificate from the trusted platform module via at least one electrical connection of the circuit board;
      the trusted platform module; and
      the at least one electrical connection between the one or more processors and the trusted platform module.

6. The charging system of claim 1, comprising the one or more processors, coupled with the memory to:
   implement a first client to:
      retrieve the certificate from the trusted platform module via at least one electrical connection;
      generate the request message to include the certificate;
      transmit the request message to the remote computing system; and
      communicate with the remote computing system via a first communication protocol responsive to the one or more processors verifying the certificate;
   implement a second client to:
      retrieve the certificate from the trusted platform module via the at least one electrical connection;
      generate a second request message to include the certificate;
      transmit the second request message to the remote computing system; and
      communicate with the remote computing system via a second communication protocol responsive to the first verification and the second verification of the certificate by the remote computing system.

7. The charging system of claim 1, comprising:
the one or more processors to establish at least one of a web-socket connection, a representational state transfer (REST) application programming interface (API) connection, or a secure shell (SSH) connection with the remote computing system responsive to the first verification and the second verification of the certificate.

8. The charging system of claim 1, comprising the one or more processors to:
receive diagnostic data comprising a description of a performance of the electrical connector to charge the vehicle; and
transmit, responsive to the first verification and the second verification of the certificate, the diagnostic data to the remote computing system via the communication connection.

9. A system, comprising:
one or more hardware processors, coupled with memory, to:
receive a request message from a computing system of a charging system, the request message comprising an identifier of the charging system and a certificate secured in a trusted platform module of the computing system;
perform a first verification that the certificate is authentic and a second verification that the certificate of the request message is mapped to the identifier via mapping data that links certificates with identifiers of charging systems, the mapping data stored by a hardware security module, the hardware security module configured to store and secure the mapping data through at least one cryptographic technique; and
responsive to the first verification that the certificate is authentic and the second verification that the certificate is mapped to the identifier, establish a communication connection with the computing system.

10. The system of claim 9, comprising:
the one or more hardware processors to:
transmit the certificate and a request to verify the certificate to the hardware security module; and
receive, from the hardware security module, an indication that the certificate is verified.

11. The system of claim 9, comprising:
the one or more hardware processors to:
receive the request message from the computing system, the request message comprising the certificate and the identifier of the charging system;
identify, based on a map, a second certificate stored by the hardware security module mapped to the identifier, the map comprising a plurality of mappings between the certificates of the charging systems and the identifiers of the charging systems;
verify the certificate received in the request message based on the second certificate; and
establish the communication connection with the computing system responsive to the first verification and the second verification of the certificate.

12. The system of claim 9, comprising:
the one or more hardware processors to:
receive the request message from the computing system, the request message comprising the certificate and the identifier of the charging system;
identify a second certificate stored by the hardware security module mapped to the identifier responsive to the first verification of the certificate;
verify the certificate received in the request message with the second certificate stored by the hardware security module; and
establish the communication connection with the computing system responsive to a determination that the certificate matches the second certificate.

13. The system of claim 9, comprising:
a first server configured to:
receive the request message from the computing system; and
communicate with the hardware security module to verify the certificate; and
a second server configured to:
receive a message from the first server that the certificate is verified;
communicate with the hardware security module to verify the certificate based on a particular certificate stored by the hardware security module mapped to the identifier of the charging system; and
establish the communication connection with the computing system responsive to the first verification and the second verification of the certificate based on the particular certificate.

14. The system of claim 9, comprising:
the one or more hardware processors to:
receive, from a client device, a request to perform one or more commands by the one or more hardware processors; and
transmit, by the communication connection, the one or more commands to the one or more hardware processors to operate the one or more hardware processors responsive to the first verification and the second verification of the certificate.

15. The system of claim 9, comprising:
the one or more hardware processors to:
receive a second request from the computing system to establish a second communication connection in a protocol different than a protocol of the communication connection, the second request comprising the certificate;
verify the certificate with the mapping data stored by the hardware security module; and
establish the second communication connection in the protocol different than the protocol of the communication connection with the computing system responsive to the first verification and the second verification of the certificate of the second request.

16. A method, comprising:
storing, by a trusted platform module of a charging system that conveys power to a vehicle, a certificate via at least one cryptographic technique;
retrieving, by one or more processors of the charging system, the certificate from the trusted platform module;
generating, by the one or more processors, a request message including an identifier of the charging system and the certificate;
transmitting, by the one or more processors, the request message to a remote computing system to establish a communication connection;
establishing, by the one or more processors, the communication connection with the remote computing system responsive to a first verification, by the remote computing system, that the certificate is authentic and a second verification that the certificate is mapped to the identifier via mapping data that links certificates with identifiers of charging systems; and responsive to the first verification that the certificate is authentic and the second verification that the certificate is mapped to the identifier, transmitting, by the one or more processors, data corresponding to power conveyed by the charging system to the vehicle.

17. The method of claim 16, comprising:

retrieving, by the one or more processors, the certificate from the trusted platform module via at least one electrical connection of a circuit board of the charging system, the circuit board comprising the at least one electrical connection between the one or more processors and the trusted platform module.

18. The method of claim 16, comprising:

receiving, by the remote computing system, the request message from the one or more processors;

verifying, by the remote computing system, the certificate with the mapping data stored by a hardware security module, the hardware security module configured to store and secure the data through at least one cryptographic technique; and establishing, by the remote computing system, the communication connection with the one or more processors responsive to the first verification and the second verification of the certificate.

19. The method of claim 16, comprising:

receiving, by the remote computing system, the request message from the remote computing system, the request message comprising the certificate and the identifier of the charging system;

identifying, by the remote computing system, based on a map, a second certificate stored by a second module mapped to the identifier, the map comprising a plurality of mappings between the certificates of the charging systems and the identifiers of the charging systems;

verifying, by the remote computing system, the certificate received in the request message based on the second certificate; and establishing, by the remote computing system, the communication connection with the one or more processors, responsive to the first verification and the second verification of the certificate with the second certificate.

20. The method of claim 16, comprising:

receiving, by the remote computing system, a second request from the charging system to establish a second communication connection in a protocol different than a protocol of the communication connection, the second request comprising the certificate;

verifying, by the remote computing system, the certificate with the mapping data stored by a hardware security module; and establishing, by the remote computing system, the second communication connection in the protocol different than the protocol of the communication connection with the charging system responsive to the first verification and the second verification of the certificate of the second request.

\* \* \* \* \*